(12) United States Patent
Bhatnagar et al.

(10) Patent No.: US 7,853,464 B2
(45) Date of Patent: Dec. 14, 2010

(54) DYNAMIC WORKFLOW ARCHITECTURES FOR LOAN PROCESSING

(75) Inventors: Pavan S. Bhatnagar, San Mateo, CA (US); Matthew E. Wyman, San Mateo, CA (US); Adam D. Springer, San Mateo, CA (US); Robert G. Carpenter, San Mateo, CA (US); Michael Piech, San Mateo, CA (US); Riad Mohammed, San Mateo, CA (US); Dain A. Ehring, San Mateo, CA (US); Steven B. Byrne, San Mateo, CA (US)

(73) Assignee: Dorado Network Systems Corporation, San Mateo, CA (US)

(*) Notice: Subject to any disclaimer, the term of this patent is extended or adjusted under 35 U.S.C. 154(b) by 216 days.

(21) Appl. No.: 11/278,929

(22) Filed: Apr. 6, 2006

(65) Prior Publication Data

US 2007/0239503 A1    Oct. 11, 2007

(51) Int. Cl.
G06F 9/44 (2006.01)
(52) U.S. Cl. ............................................. 705/7; 705/38
(58) Field of Classification Search .................... 705/7, 705/8, 38
See application file for complete search history.

(56) References Cited

U.S. PATENT DOCUMENTS

| 5,745,687 | A | 4/1998 | Randell |
| 5,974,392 | A | 10/1999 | Endo |
| 2002/0040312 | A1 | 4/2002 | Dhar et al. |
| 2003/0084016 | A1* | 5/2003 | Norgaard et al. ............... 706/60 |
| 2003/0101133 | A1 | 5/2003 | DeFrancesco, Jr. et al. |
| 2003/0105657 | A1 | 6/2003 | Nandigama et al. |
| 2003/0236692 | A1 | 12/2003 | Hertel-Szabadi |
| 2004/0162741 | A1* | 8/2004 | Flaxer et al. .................... 705/7 |
| 2005/0187809 | A1* | 8/2005 | Falkenhainer .................. 705/9 |
| 2005/0197953 | A1* | 9/2005 | Broadbent et al. ............. 705/38 |
| 2005/0289088 | A1* | 12/2005 | Tian et al. ....................... 706/1 |

OTHER PUBLICATIONS van der Aalst, Wil; van Hee, Kees "Workflow Management: Models, Methods and Systems" Dec. 2000, retrieved from fp.tm.tue.nl/beta/publications/working%20papers/Beta_wp52.pdf.*

* cited by examiner

*Primary Examiner*—Beth V Boswell
*Assistant Examiner*—Mark A Fleischer
(74) *Attorney, Agent, or Firm*—Orrick, Herrington & Sutcliffe LLP

(57) ABSTRACT

Systems and methods are provided for processing loan applications in dynamic workflows. In a preferred embodiment, a system calls an activity engine with a top-level activity for processing a work-item, e.g., a loan application. The activity engine decomposes the top-level activity into child activities and lower-level child activities, and recursively calls itself to process the child activities until all constituent child activities have been preformed, thus performing the original top-level activity. In the preferred embodiment, each activity, work-item, user, event and role has associated rules, wherein an event represents a change in state of an activity and a role represents a class of users of the system having shared attributes. The evaluation of the associated rules dynamically creates the flow of activities, thereby creating a dynamic workflow.

32 Claims, 4 Drawing Sheets

DYNAMIC WORKFLOW ARCHITECTURES FOR LOAN PROCESSING

FIELD OF THE INVENTION

The present invention relates generally to loan processing, and more particularly to systems and methods for processing loans in dynamic workflows.

BACKGROUND

The origination of mortgage loans and related products such as home equity lines of credit is highly complex in that it depends on the timely interactions of numerous participants such as brokers, lenders, appraisers, and insurers. These participants often are geographically dispersed, have varying levels of technology, are governed by different regulatory entities, and differ widely in scope and scale.

This complexity presents overwhelming challenges to the automation of loan origination through traditional methods and practices in information technology (IT), particularly workflow. Indeed the notion of a "flow" itself, the sequence of activities that unfolds in the processing of a loan, is non-deterministic, meaning that it cannot be determined in advance with a significant level of accuracy. This is due to the broad dependency of many activities on context—the values of external parameters at the moment the activity commences. An example is the willingness of a lender to relax a particular underwriting criterion based on how close it is to filling a commitment to deliver that type of loan to an investor.

In the last several decades there has been significant progress in the use of software to automate workflow, particularly in medium and large businesses. Classic examples of workflow come from manufacturing, where tasks are mostly physical and have straightforward sequencing.

The conceptual leap from automating workflow in physical domains such as manufacturing to workflow in more "virtual" domains such as financial services is moderately large but understandable for financial services having clear-cut processes. For example, it is straightforward to visualize a transaction such as a withdrawal from a checking account and how its component tasks (authentication of withdrawer, verification of sufficient funds, etc) are carried out by a combination of human and system workflow execution.

A simplifying assumption that has enabled much success in workflow automation is that the environment (the tasks, roles, events, messages, etc.) is fairly static and well-understood at the time the automation system is designed. When the environment is known, contained, and controllable, one can achieve significant automation benefits with a monolithic, client-server-based application running on a secure local network that achieves deployment and operational simplicity by imposing or assuming proprietary patterns on the environment. Further, at run-time, if the system can assume a deterministic sequence of activities at the outset of a workflow, some optimization can be made—though at the expense of flexibility to later incorporate new activities and flows.

However, in a more complex domain and environment such as mortgage origination, where tasks are distributed across multiple geographies, enterprises, and systems, and where no single entity has enough control to impose proprietary patterns, it is much more difficult to automate workflow. Traditionally, what has evolved is an environment where some level of automation has been achieved within individual enterprises but interaction with external firms is carried out through tenuous integrations or manual rekeying of data. There has been little success in achieving management or even mere statusing of participant firm workflows aggregated at an overall "meta workflow" level.

Therefore, there is a need for systems and methods for processing loan applications in complex environments, e.g., mortgage origination, in which the sequence of actions for processing the loan are not known in advance.

SUMMARY

Provided herein are systems and methods for processing loan applications in dynamic workflows, which do not require that a sequence of actions be known in advance and which have the flexibility to incorporate new activities and flows.

In a preferred embodiment, a system calls an activity engine with a top-level activity for processing a work-item, e.g., a loan application. The activity engine decomposes the top-level activity into child activities and lower-level child activities, and recursively calls itself to process the child activities until all constituent child activities have been preformed, thus performing the original top-level activity.

In the preferred embodiment, the activity engine launches an activity manager and an activity performer for each activity, wherein the activity manager manages the activity and the activity performer performs the activity by calling at least one service. The service may be a local service within the system or a remote service, and may require user interaction, e.g., an underwriting decision from an underwriter.

In the preferred embodiment, each activity, work-item, user, event and role has associated rules, wherein an event represents a change in state of an activity and a role represents a class of users of the system having shared attributes. The evaluation of the associated rules dynamically creates the flow of activities. For example, an activity may have an associated rule making the activity dependent on the occurrence of an event, e.g., a change of state of the activity or another activity. Preferably, the rules are evaluated as late as possible, allowing for the optimization of resources based on the context at the time the associated task is to be performed.

In one embodiment, the system provides a visual representation that allows a user of the system to view the status of a subset of activities for a work-item based on the role of the user, the present state of the work-item, and external context.

The dynamic workflow has the advantage of not requiring that an exact sequence of actions be known in advance. Further, the dynamic workflow makes the addition of new types of activities, users, rules and products to the system much easier without having to work through all possible flows, exceptions, and other implications of each addition.

Other systems, methods, features and advantages will be or will become apparent to one with skill in the art upon examination of the following figures and detailed description.

DETAILED DESCRIPTION OF THE INVENTION

Definitions

As used herein, the terms below are defined as follows:

Service—an encapsulation of programming logic, analogous to a procedure or method, that can be local or remote and that is callable by other Services.

System—instance of the architecture running on a particular hardware environment for a particular enterprise.

Work-Item—the main conceptual entity(ies) and associated data structure(s) being worked upon in the carrying out of activities (e.g., a loan application).

Activity—a task that must be completed. Activities may contain other Activities ("Child-Activities"). An Activity may represent logic that is carried out manually by a User, automatically by the System, or by an External System.

Child-Activity—an Activity contained by another Activity or subordinated to another Activity.

Activity Engine—a Service that processes Activities, calling Services and/or presenting a User Interface (UI) to relevant users as appropriate.

Activity Manager—an entity within the Activity Engine that manages the carrying out of an Activity. Each Activity has its own instance of an Activity Manager.

Activity Performer—an entity within the Activity Engine that does the work of an Activity. Each Activity has one instance of an Activity Performer. The Activity Performer calls Services in carrying out its work. If the Activity include Child-Activities, the Activity Performer recursively calls the Activity Engine to carry out those Child-Activities.

Conductor—a special Activity Performer that serves as the root for a hierarchy of Activities.

External System—external application or service called by System using an interface in order to carry out an Activity.

Role—a class of Users sharing certain attributes such as access privileges, ability to execute certain tasks, etc.

State—the values of input parameters and/or temporary working variables and/or results of an entity within the System (possibly the entire System itself).

Event—a discrete change in State at a discrete point in time that is represented and tracked within the system.

Pattern—a template, class, schema, structure, meta-data etc. that describes how other data is structured and/or what it means.

Instance—a particular set of data that conforms to a Pattern.

Web services—a set of protocols and practices, including XML, SOAP, and domain-specific XML schemas, that enable software applications to make calls to other applications ("services") over the Web.

User Interface

Figure 1:
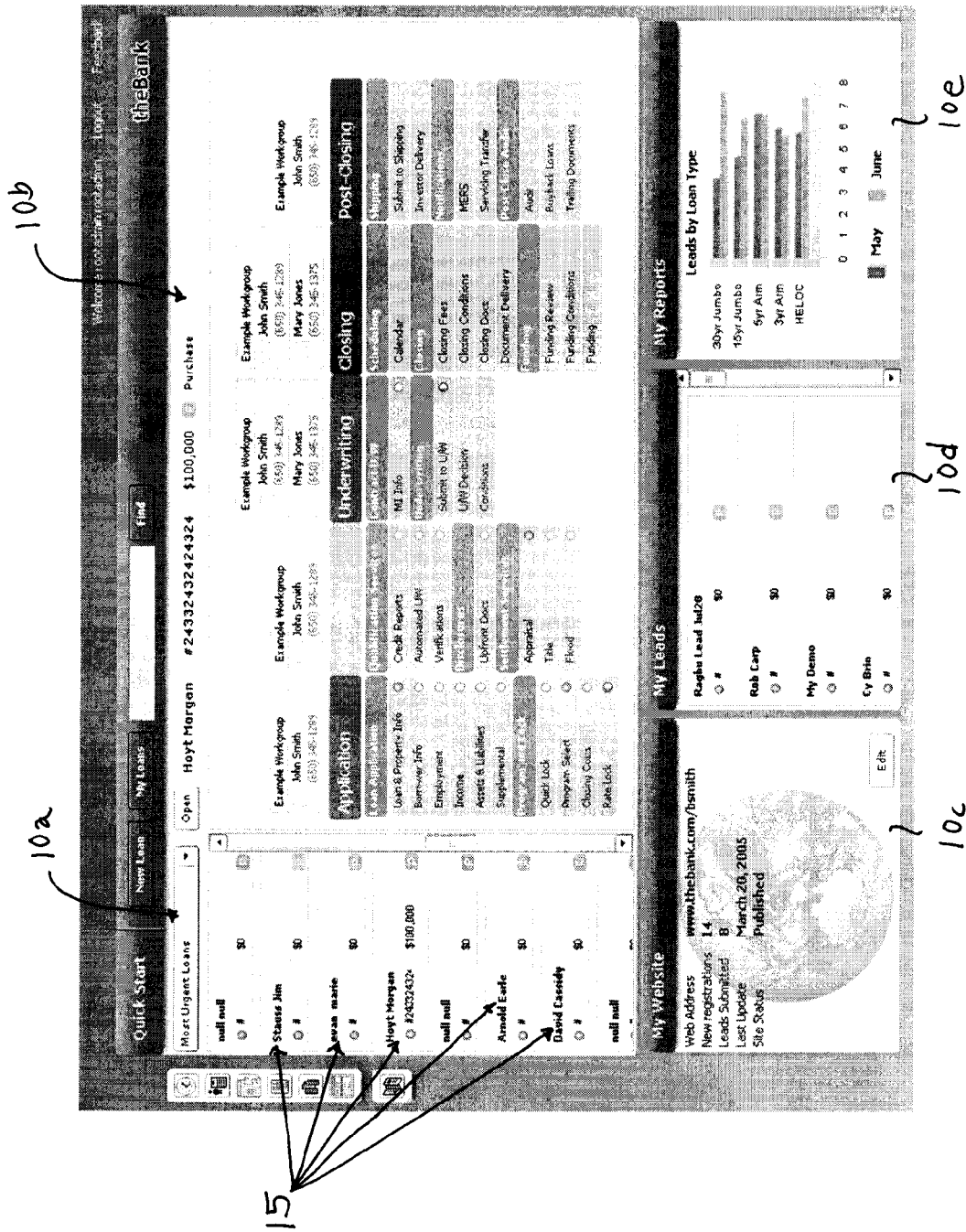
FIG. 1 shows an exemplary main screen of a user interface according to an preferred embodiment.

FIG. 1 shows an exemplary main screen of a user interface (UI) that a user sees upon login to a system according to an embodiment. The UI manifests several unique aspects of dynamic workflow that are helpful in explaining its approach and benefits.

In the preferred embodiment, the UI is completely Web-based but uses an approach referred to as rich internet applications (RIA) that brings to a web browser many of the benefits of traditional client-server applications such as high performance and complex mechanisms like drag-and-drop.

The UI can be implemented using the Macromedia "Flex" platform and its ActionScript language. This approach contains a virtual desktop within the browser window, and window-like entities called pods. Pods are the basis for modularity within the UI, and in many cases a pod corresponds to an underlying Web service.

Workflow is manifested in the UI in several important ways. To start, each user upon login sees a screen similar to the one shown in FIG. 1 but with a layout and content (pods as well as functions within pods) that are specific to his role. The example screen in FIG. 1 shows five pods 10a-e. The user may personalize the layout and content within limits defined by his role. A further basic manifestation of workflow is that the content of the pods (e.g., loans being processed) reflects the state(s) of activity(ies) in which the user is participating at a point in time. These states may be reflected in status indicators on the screen, which are discussed below.

A variant of each of two basic pods appears on every user's main screen: a Main Queue 10a and an Activity Plan 10b (e.g., a Loan Activity Plan). The Main Queue 10a contains the messages and/or links to Activities 15 that the user is currently responsible for completing. For example, when an underwriter logs in, any loans awaiting her underwriting approval will appear as clickable items in the Main Queue. The Activity Plan 10b gives the user a snapshot of the activities related to a particular work-item (loan), some of which are the user's own responsibility and some of which are assigned to other users. The Activity Plan 10b is shown in greater detail in FIG. 2. For the example in FIG. 2, the user currently logged in is John Smith. John Smith may carry out the activities within any column 20a-e in which his name appears in a workgroup 25a-e above the column. Other users, e.g., Mary Jones, who also appear in a column's workgroup 25c-d may also carry out the activities in the column 20c-d.

The Activity Plan also includes a status indicator for each activity. For example, the Activity Plan 10b in FIG. 2 has the following status indicators 30:

1. No circle next to activity indicates that the activity is not yet startable due to dependencies.

2. Clear circle indicates that the activity is startable but not yet started.

3. Half red circle indicates that the activity is started and in progress.

4. Green circle indicates that the activity is complete and valid.

5. Red circle indicates that the activity is complete but later invalidated.

Figure 2:
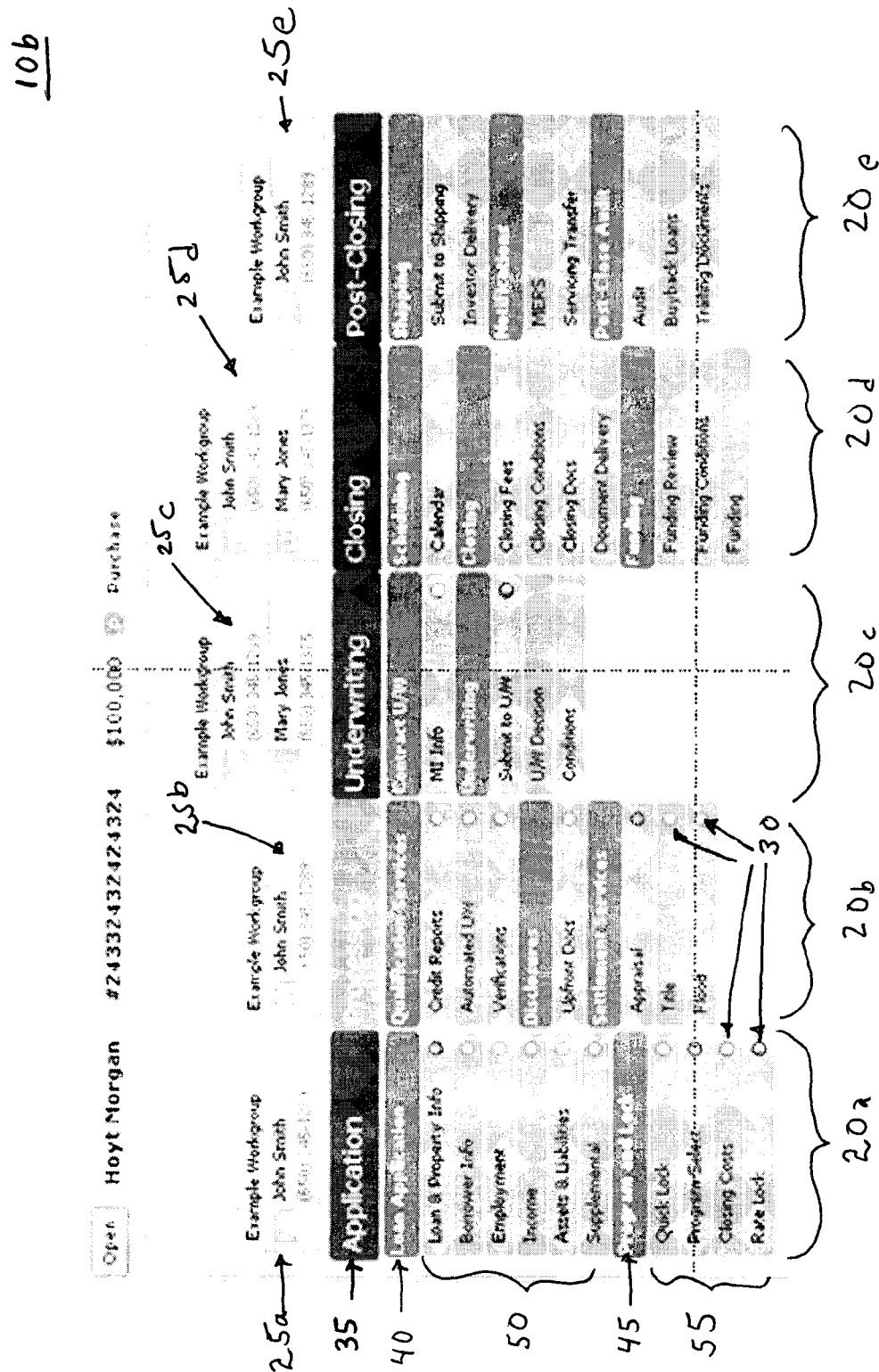
FIG. 2 shows an exemplary screen of an activity plan according to an preferred embodiment.

There are several important characteristics to note in how the dynamic workflow mechanism is manifested in the Loan Activity Plan:

1. There is not a rigidly defined template for flows and steps but rather a generalized hierarchy of activities and child activities that combine in various ways for different contexts. For example, the Activity Plan 10b in FIG. 2 shows a hierarchy of activities comprising three levels. For example, the activity "Application" 35 contains two second-level child activities "Loan Application" 40 and "Program and Lock" 45. Each of these second-level child activities 40 and 45 contain third-level child activities 50 and 55, respectively.

2. The subset of activities displayed at any moment is governed by the states of all known activities—i.e., what has already been completed, what are open and/or have issues, and what are yet to be completed. The state of an activity can be either or both its own state and the states of its child activities. Significant simplicity of definition and operation is achieved by letting a state be tracked and managed as low as possible within the branches of the hierarchy and creating roll-up views only at the moments necessary.

3. Different users see different subsets of the tasks in a particular work-item's (i.e. loan's) activities—different subsets at each level in the hierarchy. For example, a loan officer might see all steps at the top level and down to the third level in his primary ("Application") top-level task but only down to the second level under the other top-level tasks. A processor might only see the "Processing" and "Underwriting" top-level tasks but see down to the third level under both of those. The rules that govern what subsets of the task hierarchy appear to each user are organized in a mapping between the overall task hierarchy and the role hierarchy.

Dynamic Workflow Architecture

The primary element of the System is the Activity. The Activity is preferably processed by an Activity Manager, which carries out the intended actions to complete the activity by launching an Activity Performer through a recursive call to the Activity Engine. In performing an Activity, the Activity Performer may itself initiate other Activities by launching them with their own Activity Managers. Such Activities are preferably referred to as "Child-Activities", but there is nothing special about their structure or execution other than that they were launched by "Parent-Activities".

In the preferred embodiment, the Activity Engine, Activity Manager, and Activity Performer are implemented as Java classes. Instances of these classes are created and destroyed as needed while the system is running. The Java Virtual Machine that serves as the environment or "container" in which these instances (objects) are created is the BEA WebLogic application server running on the Solaris operating system on Sun Microsystems hardware. The system also uses an Oracle database, which typically runs on separate Sun harward.

Activity Performers carry out the Activity's intended actions by calling appropriate Services. A Service may be implemented within the System or interface to an external service such as a Web service. Activity Managers are robust in that they manage all states necessary to complete Activities even if they are long-running, depend on many other activities, experience a system crash or shutdown, etc. From the standpoint of the Activity Performer, calls to local and remote Services appear the same—this is the layer of abstraction that allows the system to be easily changed to perform a given service natively or via a third party. Calls to the local Service "CalculateAPR" and the remote Service "GetFloodCertificate" might look like:

```
CallService( "CalculateAPR", XMLStructHoytMorgan )
CallService( "GetFloodCertificate", XMLStructHoytMorgan )
```

The corresponding implementation of these Services might be:

```
CallService( String ServiceName,ServiceStruct ServiceInputs ) {
    Switch( ServiceName ) {
        Case( "X" ) {
            ...
        }
        Case( "CalculateAPR" )
            CallLocalService( "CalculateAPR", ServiceInputs )
        }
        Case( "GetFloodCertificate" ) {
            CallWebService( "http://service.abcflood.com", ServiceInputs )
        }
        ...
    }
}
```

Figure 3:
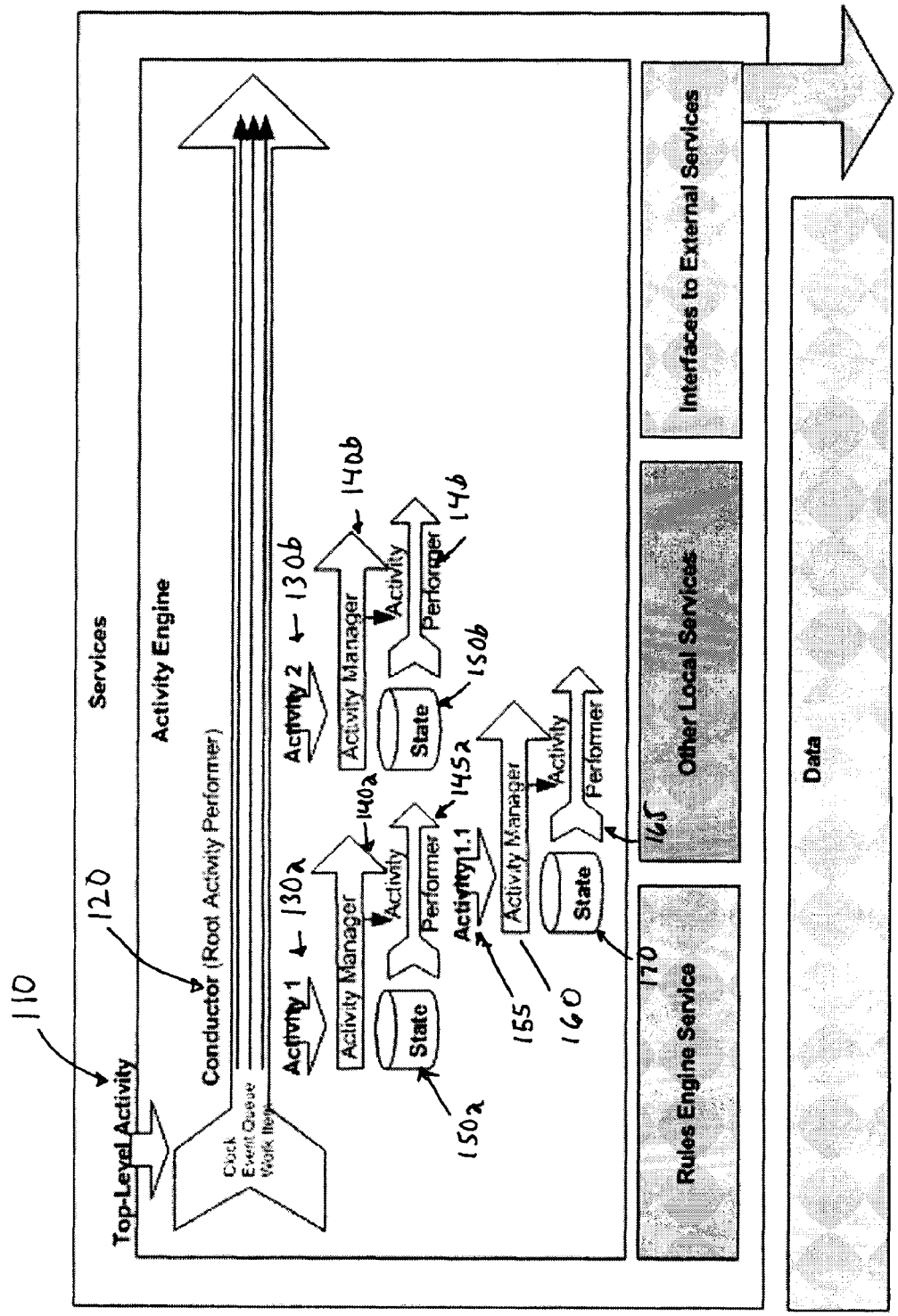
FIG. 3 is a diagram representing exemplary operations of a dynamic workflow architecture according to an embodiment.

FIG. 3 is a diagram representing exemplary operations of a dynamic workflow architecture according to an embodiment of the invention. As shown in FIG. 3, Activities are arranged hierarchical with a top-level Activity 110 (e.g., "process loan XYZ") carried out by a root Activity Performer, known as a Conductor 120. The top-level Activity 110 is decomposed into lower-level Activities 130a-b (e.g., "Application", "Processing" from FIG. 2). Each of these Activities 130a-b has a Activity Manager 140a-b, Activity Performer 145a-b and State 150a-b associate with it. Also shown is the Child-Activity 155 of Activity 130a and its associated Activity Manager 160, Activity Performer 165 and State 170.

Non-Determinism

An important aspect of the dynamic workflow is that there is no overarching rigid sequence or "flow" that is known, presented, and carried out upon launch of a top-level Activity (an example of a top-level Activity might be "process loan XYZ"). The exact set and sequence of actions is not known in advance. Each time an Activity Manager processes an Activity, it executes rules specific to that Activity using inputs specific to the context at the time the processing occurs. Some Child-Activities may not be executed at all given inputs in a particular context. Other Child-Activities may have sequence dependencies, expressed as rules, e.g., Child-A must be performed before Child-B. In cases where no such dependency exists and thus is not expressed in a rule, the Activity Performer is free to carry out the Child-Activities in any order or even in parallel.

The strength of this non-deterministic, build-as-you-go approach to workflow is that it is much easier to add new types of Activities, rules, users, products, etc. into the system without having to work through all possible flows, exceptions, and other implications of each addition. Though there are certain global optimizations that cannot be made without more determinism at the outset of a workflow, this is outweighed by the optimization that can be achieved by allowing the system to perform Activities in parallel or in a sequence best suited to the context at the time of performing.

Services and Data

There are fundamentally two types of entities in the system: services and data. Services are generalizations of program procedures or routines that are implemented using certain standards and/or practices that hide whether a given service is carried out locally or remotely. Activity Managers and Activity Performers are examples of services. The meaning of data here conforms to typical software notions of data (discussed further below). An instance of an activity is essentially a set of activity attributes and their associated instance-specific values.

The Conductor

As discussed above, Activity Performers carry out the work of Activities. A special type of Activity Performer called the Conductor serves as the root of the hierarchy of Activities that get carried out for a given top-level Activity such as "process loan". The Conductor maintains the evolving state of one or more Work-Items (e.g. a loan application) associated with the top-level Activity.

The Conductor manages an Event Queue, which receives Events from Child-Activities and services. Activity Managers can register with the Event Queue in order to receive notification when desired Events occur. The Event Queue works in conjunction with the Conductor's base "Clock" to allow events to be queued for notification at a future time. The Work-Item(s), the Clock, and the Event Queue are the three core state items that the Conductor maintains throughout its life.

Events can be thought as intermediaries by which Activities instigate change(s) in their state(s) or the state(s) of other Activities. For example, if a user of type "Processor" indicates to "Submit to Underwriting," the state of the Underwriting Activity is changed to "submitted," and an event is generated that causes the system to create an alert for the Underwriter that her input is need for the current loan. The state of the Underwriting Activity will not change until the Underwriter logs in and carries out actions that affect this state. When looking at the system as a whole, the Events are part of the overall state of the system, but from the perspective of Activities, the Events are better thought of as signals for changing a state of a Activity rather than a state itself.

As the root of the Activity hierarchy, the Conductor contains the special rules and logic to query the tree of Child Activities for their states and to manage the structure underlying the Activity Plan. As discussed earlier, there is not a rigid, deterministic plan that is known comprehensively at the outset of executing a top-level Activity. Rather, at any given moment, there is the set of states of all Activities that have been completed, and the set of likely future Activities that are expected to be carried out based on the context at the moment.

There is a subtle trade-off between determining enough of what is expected in the future to present a useful "plan" and leaving enough undetermined so that computation is not wasted. The Conductor is where this optimization is embodied.

The Activity Engine: Recursive Activities

The Activity Engine is the service that "hosts" the Activity Managers; it is the virtual machine on which an Activity Managers' processes run. It is essentially a recursive procedure: one calls the Activity Engine with an Activity, and the Activity Engine decomposes the Activity into Child-Activities, calling itself to process each Child-Activity. To start the whole procedure, the System calls the Activity Engine with a Top-Level Activity. Again, the Activity Performer for the Top-Level Activity is the Conductor.

As discussed above, in the preferred embodiment the Activity Engine is implemented as a Java class, a single instance of which is created and launched along with a Conductor to jump start the system.

Data

Discussions above regarding some of the basics of the workflow mechanism make loose references to data and data structures such as "state" and the data of the Activities themselves. The discussion that follows looks in greater detail at some of the basic types of data, how they relate, and how frequently they change so as to bring more specificity to how the mechanism works. The diagram in FIG. 4 expands the "Data" box from the previous diagram to help establish a working vocabulary of entities.

Categories of Dynamic

The data types are preferably roughly organized into three categories based on relative frequency of change. Somewhat Dynamic Data 210 is likely represented in software configuration files or in fairly static database schema; these may change on a scale of weeks or months, with fairly restricted access to change. They are typically patterns or structures, instances of which are created and deleted frequently in one of the more dynamic categories. Moderately Dynamic Data 220 are instances of the patterns in the Somewhat Dynamic category, or they are patterns that can be created through UI rather than programming (e.g. the creation of a new Event pattern). Highly Dynamic Data 230 are instances of patterns from the previous categories.

An important point in making this distinction is that, in contrast to the traditional way of thinking about databases where one creates the structure at design-time (tables and relations) and populates the structure with instances (rows in the tables) at run-time, the system derives significant flexibility from the ability to easily create new structures without reprogramming the system.

Rules

Figure 4:
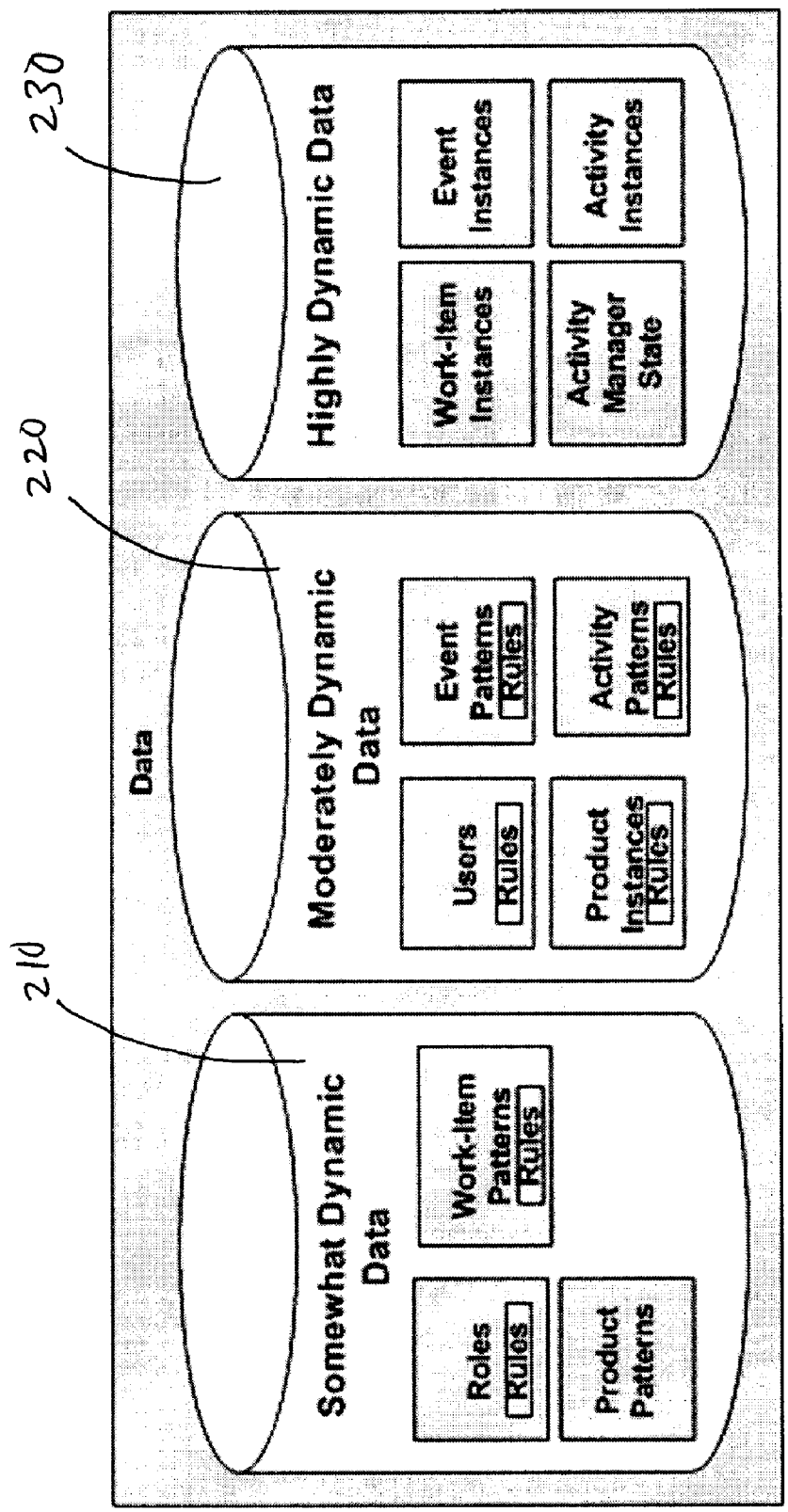
FIG. 4 is a diagram representing data types and structures that are used to support to a dynamic workflow architecture according to an embodiment.

Another important feature to convey in the diagram in FIG. 4 is the variety of rules and the types of data fundamentally dependent on, or expressed as, rules. This is why the Rules Engine is highlighted as a special service in the services architecture diagram in FIG. 3, and the rules as special data structures in FIG. 4. As referenced earlier, a significant way in which the invention simplifies the computational complexity of managing workflow in a complex domain such as loan processing is to "construct" the workflow dynamically as it unfolds rather than statically at the outset. In addition to enabling optimization based on contextual input unforeseeable up front, this approach also simplifies computation (and thus improves performance) because only the logic that is relevant to a particular workflow is evaluated. The primary method for achieving this "last-minute" evaluation of logic is to encode such logic as rules rather than explicit steps that have to be added to each of many procedures. By encoding rules using consistent patterns and syntax, one can concentrate the responsibility for optimal evaluation and execution of rules in a localized entity as we have done in the Rules Engine Service.

Note that the Rules Engine is essentially a stateless machine, meaning that for a given task (e.g. determining what to display on the screen) the engine is given the rule-set and any needed inputs, and it processes the rules in order to return outputs to the caller. Thus it is up to the callers of the Rules Engine to store their respective rule-sets, any state used as inputs, and any state needed to track when previous rule outputs are still valid versus when the Rules Engine needs to be called again. One example is a rule-set governing what to display for a Loan Activity Plan—this rule-set likely needs to be run each time the screen changes in order to be assured of reflecting up-to-date parameters such as the current window size and current statuses of all displayed activities. Another example is the rule-set governing whether the status of an Activity is complete and valid (resulting in a full green Status Indicator). The Activity itself "listens" for certain Events that indicate a state change in a dependent Activity that renders the current Activity no longer valid. When such an Event occurs, the Activity re-calls the Rules Engine with the validation rule-set, and if the Activity is determined to be no longer valid, the state and Status Indicator are changed accordingly.

Data Types

The main data types that are key to the dynamic workflow approach are categorized. Note that most data types comprise a pattern and instances and that for each data type rules may be associated with a pattern (covering all instances of the pattern), an instance (applying only to a single instance) or both.

Roles are the basic patterns for Users. Rules can be created at the pattern or instance level.

A Work-Item is the main entity being worked on, such as a customer record (loan application). Rules can be created at the pattern or instance level.

Products are associated with a Work-Item as part of carrying out Activities. The notion of a Product is perhaps a more specific to the financial domain than other concepts here such as Role and Work-Item, but the general activity of applying for, qualifying for, and ultimately receiving a financial product motivates much of the workflow approach. Rules are defined for Product instances. An example of a loan product is a 30-year fixed-rate mortgage. An example eligibility rule is "applicant is eligible for this product if applicant's loan-to-value ratio is less than 80%". An example adjustment rule is "if applicant's loan-to-value ratio is greater than 75% and less than 80%, add ⅛ to the base rate".

Events are generated by the carrying out of Activities and are used as inputs to Rules governing the need and timing of other Activities. Event rules are defined at the instance level.

Activities are the elemental unit of work described earlier. Activity rules are held in the patterns.

State, such as Activity Manager State (represented both in FIG. 4 and as the small cylinders in FIG. 3, includes whatever logistical or ancillary data is needed to carry out activity and/or survive system interruptions.

Activity Plan Details

As discussed earlier, unlike traditional workflow systems and approaches, the present dynamic workflow approach does not have a predefined flow or sequence of tasks at the outset of a process. Instead there is a notion of a goal, the means to achievement of which is represented by an Activity. The Activity is given to an Activity Engine, which decomposes the Activity into Child-Activities and low-level units implemented as Services. The Activity Engine recursively calls itself with Child-Activities until all constituent Child-Activities have been performed, thus fully performing the original top-level Activity. This describes how work to be done to fulfill a goal is represented and carried out.

In addition, a key feature of this approach and the hierarchical representation of Activities is how the system can check and present status of the work being carried out. Looking again at the screen shot of the example Loan Activity Plan in the FIG. 2 above, Activities are represented on the screen. Using the terminology established above, a basic Work-Item is depicted, which is a loan application. The Activity Engine has been called by the system with top-level Activity "Process Loan" for this particular loan. A User, who is responsible for one or more of the Activities constituent to this instance of "Process Loan" has logged into the system and sees the above screen.

The set of Activities displayed in the Activity Plan is not fixed or coded into the UI but is rather determined at the moment display is requested according to the following criteria:

1. All Activities that have been launched and are either complete or in progress under the Conductor for the Work-Item at hand.

2. The Activities are filtered by basic display rules (e.g., maximum number of first-level activities displayed horizontally across the page, number of levels below the first level to be displayed, maximum number of activities that can be displayed vertically, etc.).

3. The Activities are further filtered by rules specific to the user's Role (e.g., specific first-level Activities to display or not display, number of levels below each of those first-level Activities to display, etc.).

4. The Activities are further filtered by rules specific to the Work-Item and the state of the Work-Item (e.g., whether a particular document required by an Activity has been received and has passed data validation rules).

5. In addition, display not-yet-started Activities only as far to the right and as far down as the display and role rules allow and as can be determined given the current context.

Basically, when a User arrives at a screen with an Activity Plan, the system makes a call to the Activity Engine with display and role rules to get back representations of the appropriate Activities and their respective statuses. The Activity Engine traverses its hierarchy of completed and in-progress Activities, obtaining representations and statuses for the ones that meet the filtering criteria. For Activities that have not yet started but which meet the filtering criteria and what is known from the current context, the Activity Engine evaluates just enough of the Activity logic to return a useful representation (e.g., a name).

WORKING EXAMPLE

In FIG. 2, John Smith, a processor, is logged in and looking at a home purchase loan application for $100,000 for Hoyt Morgan. As depicted, this is fairly early on in the processing of this application—one of the sections of Loan Application data has been completed, a loan Program has been selected, a Rate Lock is in progress, an Appraisal has been ordered, received, and validated, and underwriting is in progress.

At the moment this loan was first created, a Conductor (again, a special-case Activity Performer responsible for performing a top-level Activity) was created and launched with the data structure comprising the data for the Hoyt Morgan loan. One could envision this kickoff call (simplified here for readability) as Conductor ("ProcessLoan", LoanAppHoytMorgan)

The overall hierarchy of activities (shown down to three levels) for a purchase loan is as follows:

Application
    Lead Information
    Lead Source and Data Info
    Loan Application
    Loan and Property Info
    Borrower Info
    Employment
    Income
    Assets and Liabilities
    Supplemental
    Program and Lock
    Quick Lock
    Program Select
    Closing Costs
    Rate Lock Processing
    Qualification Services
    Credit Reports
    Automated Underwriting
    Verifications
    Disclosures
    Upfront Does
    Settlement Services
    Appraisal
    Title
    Flood Underwriting
    Contract U/W
    Mortgage Insurance Info
    Underwriting Submit to Underwriting
Underwriting Decision
Conditions Closing
Scheduling
Calendar
Closing
Closing Fees
Closing Conditions
Closing Docs
Document Delivery
Funding
Funding Review
Funding Conditions
Funding Post Closing
Execution
Pooling
Shipping
Submit to Shipping
Investor Delivery
Notifications
MERS
Servicing Transfer
Post-Close Audit
Audit
Buy Back Loans
Trailing Documents The underlined Actions do not appear in John's screen depicted in FIG. 2 because John is of user role "Processor", which would never have need to execute or even view status of those Activities.

Referring back to the section on data and FIG. 2, a template for each of the Activities above is described in the system as an Activity Pattern. A large part of the Pattern's information is encoded in the form of Rules. There are many categories of Rules for each Activity, such as display, status, and dependency rules.

For example in the Activity "Rate Lock" in the above example, a display rule might be

```
DisplayInActivityPlan
    IF Role=LoanOfficer OR Role=Processor OR Role = Assistant
    ANDIF VerticalPosition <= MaxVerticalPosition
    ANDIF HorizontalPosition <= MaxHorizontalPosition
```

Status rules might be

```
ShowCompleteValid
    IF RateLockComplete = TRUE AND RateLockValidation = VALID
ShowCompleteInvalid
    IF RateLockComplete = TRUE AND RateLockValidation =
    INVALID
```

In another activity, "Conditions", under the "Underwriting" top-level Activity (middle column), an example dependency rule might be DEPENDENCY=Status (UnderwritingDecision)
=COMPLETE_VALID The Conductor checks dependency rules before status rules, and since the dependency on "Underwriting Decision's" status being complete and valid is not fulfilled, no status indicator is displayed for the "Condition" Activity. Thus John cannot launch this activity before an underwriting decision has been rendered. In contrast both Title and Flood are startable (bottom of second column, "Processing"); John could start these in either order and could start the second one before the first one finishes, the system carrying out its parts of the activities in the background in parallel.

If, e.g., John wants to initiate getting a flood certificate, he clicks the Activity "Flood" (at the bottom of the second column, "Processing"); this interaction is processed by the Conductor and understood to be the launching of an Activity; the Conductor launches an Activity Manager:

ManageActivity ("Flood", LoanAppHoytMorgan)

The Activity Manager initializes any state variables needed for this activity and in turn calls an Activity Performer to carry out the work:

PerformActivity ("Flood", LoanAppHoytMorgan)

PerformActivity entails a recursive call to the Activity Engine (the Activity Engine is the software entity that does the performing). Each Activity has a data structure (defined by the Activity's pattern) that includes a list structure for any Child Activities. PerformActivity will create Activity Managers for any such Child Activities, and each Activity Manager will initialize the necessary state and launch Activity Performers as above. This is how the recursion of the Activity Engine is implemented. Here is a simplified example of the implementation of the PerformActivity routine in pseudo-code:

```
PerformActivity( String ActivityName, ActivityStruct ThisActivity ) {
    Switch( ActivityName ) {
        Case ( "X" ) {
            ...
        }
        Case ( "Y" ) {
            ...
        }
        Case( "Flood" ) {
            ...
            If( ThisActivity.ChildActivities.Count > 0 ) Then
            {
                Foreach( Activity in
                    ThisActivity.ChildActivities
                ) do {
                    ManageActivity( Activity.Name,
                    LoanAppHoytMorgan )
                }
            }
        }
    }
}
```

In the example above, a flood certificate is generated by an external, third-party service. A simple UI is presented for the user to double-check some key data elements and perhaps choose a particular vendor. When the user is finished with this screen and indicates to continue, the Activity Performer makes the call to the external provider, something along the lines of CallWebService( https://service.aaaflodcertificates.com,
    XMLStructHoytMorgan )

A good example of how Events, the Conductor's Event Queue, and the Conductor's Clock fit together is the submission to underwriting. Assuming John has submitted (thus the Status Indicator next to "Submit to U/W" would have turned to full green), and though he can start and even finish Activities that don't have dependencies on Underwriting (such as Title and Flood), he cannot start clearing conditions until "U/W Decision" has turned to full and green. John himself, as a Processor, cannot carry out the underwriting decision (it is there in his list because he is critically dependent on its status). The Underwriter (Mary Jones) must carry out the Underwriting Activity.

The moment John completes "Submit to U/W", two Events are generated and put in the Conductor's Event Queue. The first is for Mary, indicating that there is an Activity for this Work-Item (the Hoyt Morgan loan) that requires her input or attention. This Event causes as item to appear in Mary's Main Queue the next time she logs in, and, if the system is so configured, also triggers an email to be sent to Mary indicating that she should log in. The second Event is for the Conductor itself, an "escalation" event with a target time set in the future (e.g. 48 hours from the moment of submission). The Conductor uses its Clock to regularly (e.g. every 10 minutes) check the Event Queue for clocked Events. In this example, if 48 hours elapse and the Conductor finds that Mary has not responded to her Event for the Hoyt Morgan loan, the escalation Event will cause the Conductor to generate a new event for Mary's boss and/or a peer to get the dependent Activity (underwriting decision) fulfilled.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the "true" spirit and scope of the invention.

What is claimed is:

1. A computer-implemented method for processing a loan application, comprising:
    launching a top-level activity for processing the loan application on an activity engine implemented on a computer;
    associating a conductor implemented on the computer with the top-level activity, wherein the conductor maintains the current state of the top-level activity and manages an event queue;
    decomposing the top-level activity into a plurality of child activities, wherein each of the child activities represents a task to be completed in processing the loan application;
    launching the plurality of child activities on the activity engine;
    associating an activity manager and an activity performer implemented on the computer with each of the child activities, wherein each of the activity managers manages the respective child activity and each of the activity performers performs the respective child activity by calling at least one service;
    each activity manager determining the current state of its respective child activity,
    the conductor receiving the current state of a child activity from its respective activity manager,
    the conductor calling the activity engine to perform the plurality of child activities unless the current state of each of the child activities is complete,
    the activity manager causing the activity performer to perform the child activity unless current state of child activity is complete,
    the activity performer of a child activity having one or more lower-level child activities calling the activity engine to perform the one or more lower-level child activities unless the current state of each of the one or more lower level child activities is complete, wherein the plurality of child activities and one or more lower-level child activities are performed using one or more inputs specific to each activity at the time of performance based on a set of constraints specific to each activity,
    the conductor receiving an event signaling a change in state of a dependent child or lower-level child activity that is dependent upon one or more other child or lower-level child activities,
    each activity manager of the one or more child or lower-level child activities from which the dependent child or lower-level child activity depends receiving from the conductor the event signaling a change in state of the dependent child or lower-level child activity, wherein the change of state of the dependent child or lower-level child activity indicates that one or more child or lower-level child activities from which the dependent child or lower-level child activity depends is no longer valid with each activity manager of the one or more child or lower-level child activities that are no longer valid causing the respective activity performer to perform the respective child or lower-level child activity until it is complete, and
    presenting a user having a role with a user interface (UI) implemented on the computer, wherein the UI includes a list of child activities and lower level child activities comprising a subset of the plurality of child activities and one or more lower level child activities that is a function of the user's role and the state of each of the plurality of child activities and one or more lower level child activities, and wherein the UI includes visual state indicators associated with and corresponding to the current state of each of the listed child and lower level child activities.

2. The method of claim 1, wherein at least one service is a local service residing on the same system as the activity engine.

3. The method of claim 1, wherein at least one service is an external Web service.

4. The method of claim 1, wherein at least one service is a local service residing on the same system as the activity engine and at least one service is an external Web service.

5. The method of claim 1, further comprising:
    launching the plurality of lower-level child activities on the activity engine,
    associating an activity manager and an activity performer with each of the lower-level child activities, wherein each of the activity managers manages the respective lower-level child activity and each of the activity performers performs the respective lower-level child activity by calling at least one service.

6. The method of claim 1, further comprising:
    the user to enter information for at least one of the activities through the user interface.

7. The method of claim 6, further comprising:
    displaying a main queue to the user on the user interface, wherein the main queue provides the user with a link to at least one of the activities; and
    displaying an activity plan to the user on the user interface, wherein the activity plan shows the user the subset of the activities and a status for at least one of the subset of the activities, and wherein the activity plan indicates to the user which of the subset of the activities are assigned to the user.

8. The method of claim 6, further comprising alerting the user through the user interface to perform one of the subset of the activities when an event occurs.

9. The method of claim 8, wherein the event is triggered by completion of another activity.

10. The method of claim 8, wherein the user is a loan processor and the event is triggered by an indication from another user to submit the loan application for processing.

11. The method of claim 10, wherein the other user is an originator.

12. The method of claim 8, wherein the user is a manager and the event is triggered by an indication from another user that assistance is needed on the loan application.

13. The method of claim 12, wherein the other user is a subordinate of the manager.

14. The method of claim 8, wherein the user is an underwriter and the event is triggered by an indication from another user to submit the loan application to underwriting.

15. The method of claim 8, wherein the user is a closer and the event is triggered by an indication from another user that the loan application is complete and ready for closing.

16. The method of claim 1, further comprising associating a set of constraints with each of the activities.

17. The method of claim 16, wherein the set of constraints for at least one of the activities includes a dependency rule specifying that a user cannot enter information for the respective activity until the occurrence of an event.

18. The method of claim 17, wherein the event is triggered by completion of another activity.

19. The method of claim 17, wherein the event is triggered by submission of the loan application to processing.

20. The method of claim 17, wherein the event is triggered by locking a loan product.

21. The method of claim 17, wherein the event is triggered by completion of a title insurance, a flood certificate or an appraisal.

22. The method of claim 17, wherein the event is triggered by an underwriting decision.

23. The method of claim 17, wherein the event is triggered by the clearing of one, some or all underwriting conditions.

24. The method of claim 17, wherein the event is triggered by the completion of closing.

25. The method of claim 17, wherein the event is triggered by the completion of loan funding.

26. The method of claim 17, further comprising:
maintaining the event in an event queue; and having the activity that is dependent on the event listen for the event in the event queue.

27. The method of claim 16, wherein the set of constraints for at least one of the activities includes a display rule specifying whether the activity is to be displayed to a user based on a role of the user.

28. The method of claim 16, wherein the set of constraints for at least one of the activities includes a status rule specifying the status of the respective activity.

29. The method of claim 16, wherein the set of constraints for at least one of the activities includes a dependency rule specifying whether the respective activity can be performed based on the status of another activity.

30. The method of claim 16, wherein the set of constraints for at least one of the activities includes a rule specifying whether the respective activity launches a lower-level child activity based on the occurrence of an event.

31. The method of claim 17, further comprising evaluating additional rules only after the dependency rule has been satisfied.

32. The method of claim 31, wherein the additional rules comprise display rules, status rules, other dependency rules, or a combination thereof.

* * * * *